Feb. 6, 1968   M. C. SWANSON   3,368,214
OPERATING SHAFT INDICATORS FOR CROP HARVESTING MACHINES
Filed March 10, 1965   2 Sheets-Sheet 1
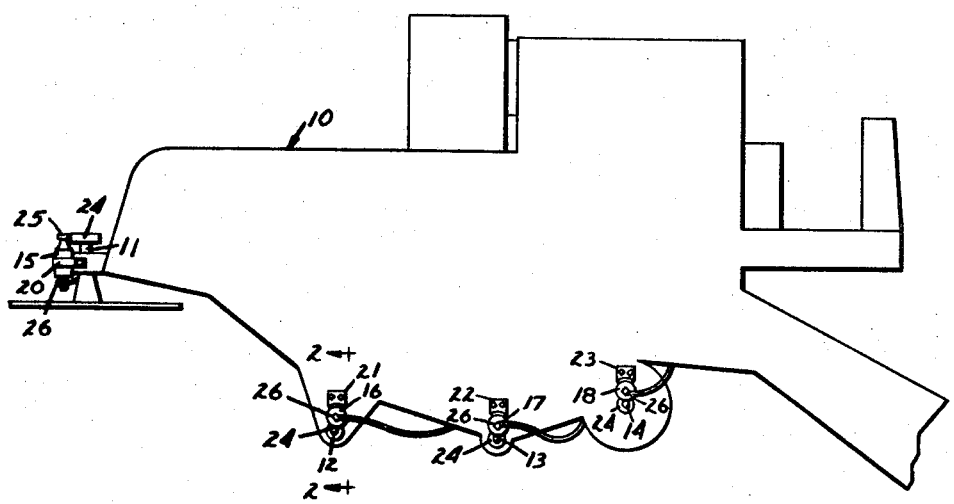
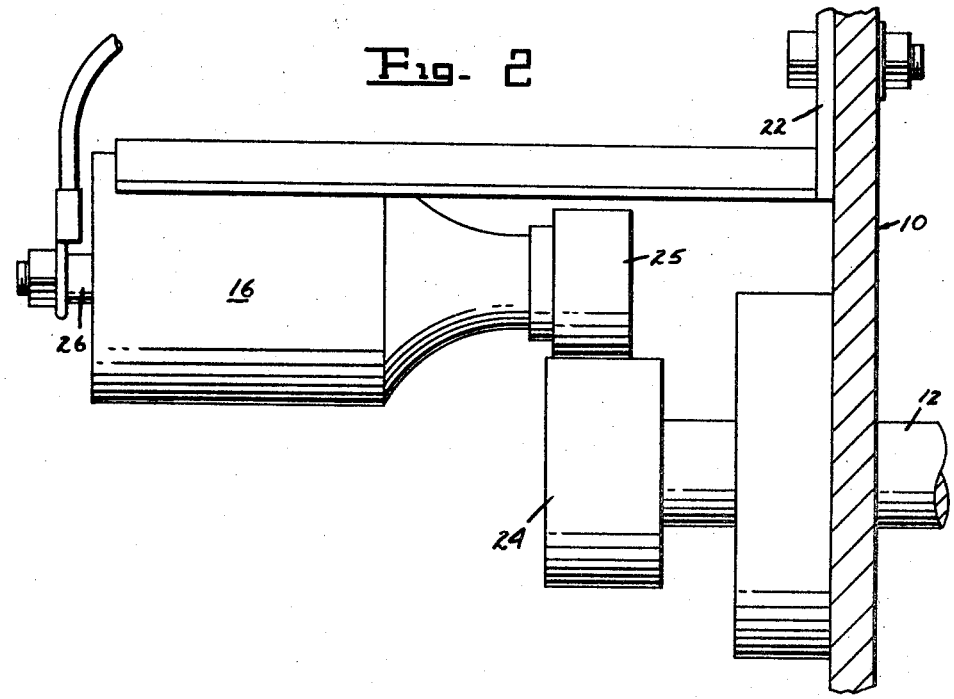
INVENTOR.
MORTON C. SWANSON
BY *Wells & St.John*
ATTYS.

Feb. 6, 1968  M. C. SWANSON  3,368,214
OPERATING SHAFT INDICATORS FOR CROP HARVESTING MACHINES
Filed March 10, 1965  2 Sheets-Sheet 2

INVENTOR.
MORTON C. SWANSON
BY
*Wells & St.John*
ATTYS.

United States Patent Office 3,368,214
Patented Feb. 6, 1968

3,368,214
OPERATING SHAFT INDICATORS FOR CROP
HARVESTING MACHINES
Morton C. Swanson, c/o Swanson Spray & Manufacturing
Inc., Palouse, Wash. 99161
Filed Mar. 10, 1965, Ser. No. 438,551
10 Claims. (Cl. 340—271)

ABSTRACT OF THE DISCLOSURE

A monitoring system is mounted on a portable harvesting machine such as a combine for monitoring whether the various operating elements are functioning properly by sensing whether specific shafts of the elements are rotating. The monitoring system includes generators positioned adjacent respective shafts and driven through separate friction drive drums. The voltages generated from the generators are amplified to relays having normally closed contacts that are opened when the relays are energized. A buzzer and a warning light is wired to the contacts and operated when the contacts are closed to warn the operator that one or more of the shafts have stopped rotating.

---

This invention relates to an apparatus for providing an automatic signal to indicate the malfunction of a rotating shaft. It is designed primarily for crop harvesting machines such as combines.

The present invention is concerned with an alarm system for monitoring a shaft that is continuously rotated during normal operation of a machine such as a combine and provides a unique arrangement for signalling to the operator of a machine the malfunction of a shaft monitored thereby.

In order to provide a monitoring alarm system, an electrical generator is powered by the constantly rotating shaft being monitored. The generator powers a signal lamp normally located at a position convenient to the machine operator so that this lamp will at all times be lighted when the shaft is rotating properly. In addition, the generator is used to control the normal energized operation of a relay coil having normally closed contacts wired in series with a horn or buzzer and a light which will be energized if the circuit to the relay coil is open. Thus, if the shaft should stop or be slowed due to some blockage or other malfunction, the signal devices controlled by the relay contacts will be energized and the normally lit lamp associated with the shaft will be darkened. A number of relays can be used in parallel to control the alarm horn or light, each being individually operated by a separate generator powered by different shafts. In this instance, an individual lamp will be lighted by each generator, so that the common signal device will indicate a malfunction in one part of the system and the lamp darkened by stoppage of that particular generator will indicate to the operator exactly where the trouble is located.

It is a first object of this invention to provide a mechanically and electrically simple alarm system that can be used on machinery, such as a farm combine, to immediately signal the stoppage of a continuously rotating powered shaft, and to indicate to the operator of the machine the location of the problem.

Another object of this invention is to provide such a system that can utilize a relatively small generator as the detector to monitor the rotation of the shaft, the power from the generator being used to energize a lamp to signal proper operating conditions. The generator power is also used to normally hold a signal system in an alert condition by means of a transistorized amplifier circuit requiring little extra power from the generator itself. Should the generator fail to operate due to stoppage of the shaft, the relay will immediately activate a signal to alert the operator of the machine so that corrective measures can be taken.

These and further objects will be evident from a study of the following disclosure, taken together with the accompanying drawings, which show the basic concept of this invention with two alternate types of circuits that might be used in its practice. It is to be understood that the illustrated structures are only exemplary, and that other equivalent devices and circuits might be used in their places.

Referring now to the drawings:

FIGURE 1 is a somewhat schematic side view showing the outline of a combine with detecting generators mounted at the side of the combine and driven by shafts monitored by the signal alarm system;

FIGURE 2 is an enlarged sectional view taken substantially along line 2—2 in FIGURE 1;

Figure 3:
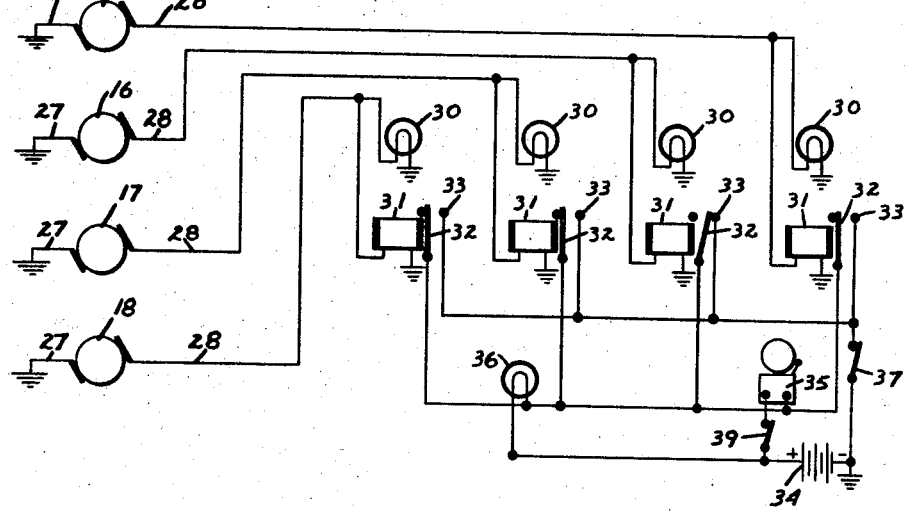
FIGURE 3 is a first circuit diagram showing an illustrative circuit for the alarm system.

A combine, such as used in the harvesting of wheat and other grain crops is a large and very complex piece of mechanical apparatus. Self-propelled combines commonly used today require only a single operator, normally riding at the front of the machine and constantly engaged in observing the field ahead and the crop as it is harvested. Behind him is the great bulk of the machine, which includes several different mechanisms operating constantly to separate the grain from the remainder of the harvested plant. These mechanisms are complex, and are subject to occasional damage due to the nature of the material itself, which sometimes clogs the various mechanisms with chaff or straw. Often, the operator is not aware of such trouble until the entire machine is plugged with the harvested crop, often resulting in the burning of power belts, the slippage of driving chains, the breaking of sprockets or numerous other malfunctions which in turn result in costly repairs and loss of extremely valuable harvesting time. The present invention is designed to provide a detector system to constantly monitor the most important operating shafts on the machine and signal to the operator immediately any malfunction so that corrective measures can be taken without delay.

In FIGURE 1 is illustrated the outline of a typical harvester, and since the details of the harvesting mechanism are not particularly important to an understanding of the present alarm system, the details have not been illustrated. The combine is shown with an outer frame generally designated by the numeral 10. There are four shafts shown with monitoring detector generators in this drawing, although any number can be used as might be desired by particular circumstances. In the present instance, four typical important shafts are the shaft 11 for the straw chopper at the rear of the combine; the shaft 12 for the clean grain elevator; the shaft 13 for the return elevator; and the shaft 14 for the separator fan.

Each of these shafts is monitored in basically the same manner by a generator that is powered through a pair of frictional drums in contact with one another, one drum being mounted on the monitored shaft and the other on the generator shaft. The generators associated with shafts 11 through 14 are numbered 15 through 18 respectively. They are mounted on the frame 10 by universal adjustable brackets 20 through 23 respectively. The frictional drum mounted on the monitored shaft is designated by the numeral 24, while the drum in contact with it and fixed to the generator shaft is designated by the numeral 25. The generator shown in detail in FIGURE 2 is illustrated with outlet terminals 26 from which wires lead to the circuitry shown in FIGURES 3 and 4.

It will be understood from FIGURES 1 and 2 that the respective generators 15 through 18 will generate the required electricity for the alarm system so long as the shaft with which they are associated is rotating at its required speed. The size of the various drums 24 and 25 must be geared to the respective speeds of the shafts monitored thereby, so that the electrical output of each generator 15 through 18 will be susbtantially the same. The generators are preferably alternating current generators or alternators.

As shown in FIGURE 3, one typical circuit for supplying the necessary alarm system uses the alternating current generators 15 through 18 to directly power individual relays for the signal mechanism. Each generator is wired in the same manner in the circuit. Although the circuitry for four generators is shown in FIGURE 3, it is obvious that any number of generators can be used by duplicating the circuit connections as illustrated.

Each generator 15 through 18 has one terminal outlet 27 connected to ground. The other terminal outlet 28 is wired to a first signal lamp 30. The remaining terminal of lamp 30 is also wired to ground, so that each lamp 30 will remain lighted so long as the respective generator to which it is operatively connected remains in operation. Thus the function of lamps 30 is to indicate proper operation of the respective generators 15 through 18.

Wired in parallel with each lamp 30 is the coil of a relay 31. Relay 31 is shown with a movable armature 32 and normally closed contact points 33 wired in a series circuit with a signal horn or buzzer 35 and a lamp 36 across the supplementary source of power, such as a battery 34. A switch 39 is wired in series with buzzer 35 alone. Also interposed in this circuitry in series with the normally closed points 32, 33 is a master control switch 37, which might be the machine ignition switch. Thus, when the relays 31 are energized due to proper functioning of generators 15 through 18, the circuit to the bell 35 and lamp 36 will be open and they will not be energized. When a generator fails to operate, as illustrated by generator 16 in FIGURE 3, the points 32, 33 will close and complete a circuit to sound the bell 35 and lamp 36 will be lighted. At the same time, the lamp 30 associated with this generator 16 will be darkened, so that the operator of the machine will be aware not only that a malfunction has occurred, but will also be signalled as to the location of the malfunction by the darkened lamp. He can then take proper measures to correct the situation before additional damage is done.

In order to economically use rather small generators, it is necessary to provide an amplifier circuit between the generator and the relay controlled thereby. This is the type of circuit which has actually been used on combines due to the greater practicality of a smaller generator system.

Figure 4:
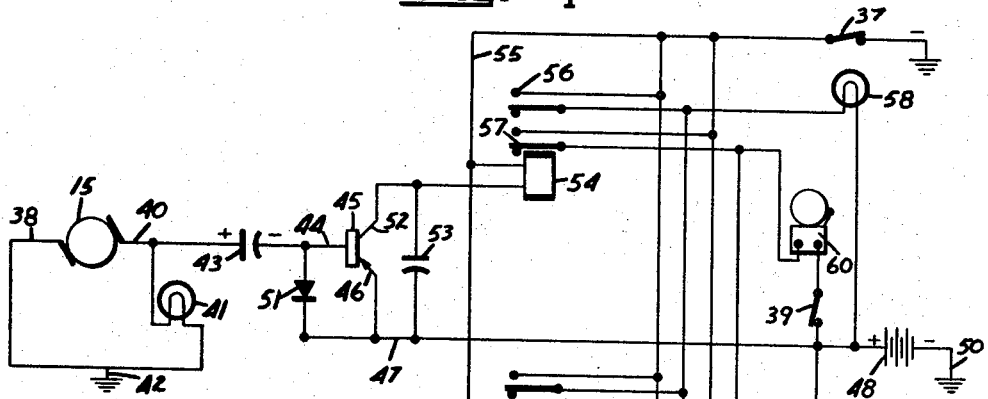
FIGURE 4 is a fragmentary circuit diagram of a second circuit utilizing a smaller capacity generator.

FIGURE 4 illustrates the circuitry for one complete generator system, it being obvious that additional generator circuits can be added in the same manner as shown in FIGURE 3. In this instance, the generator 15 has its terminal outlets 38 and 40 connected to the terminals of a lamp 41. The terminal outlet 38, which might be the generator case, is mounted on the machine frame and thus grounded. The terminal outlet 40 is connected to a capacitor 43 to the base connection 44 of a transistor 45. The transistor is any suitable transistor of the PNP type, although an NPN transistor can be used by reversing the polarity of the circuit associated with it. The emitter connection 46 of transistor 45 is connected by a line 47 to the plus side of a source of direct current power such as a battery 48. The negative side of battery 48 is grounded at 50.

Also wired between the base 44 of transistor 45 and the emitter connection 46 is a diode 51. Wired between the collector terminal 52 of the transistor 45 and the lead 47 is a capacitor 53. The collector terminal 52 is wired to one terminal of the coil of a relay 54, the remaining terminal of the coil for relay 54 being wired to ground through a connection 55 and a master control switch 37.

The relay 54 is provided with two sets of normally open contacts 56 and 57 which in turn are wired across parallel power circuits for a lamp 58 and signal horn or buzzer 60 respectively. Again a switch 39 is wired in series with buzzer 60. The circuits for lamp 58 and buzzer 60 are also powered through the source of electrical power of battery 48.

The alternating current generator 15 preferably has just slightly more power at the proper operating speed of the shaft monitored thereby than necessary to light the lamp 41. The properly operating generator 15 provides a fluctuating negative voltage to the base 44 of transistor 45 sufficient, during application of the negative voltage, to permit the transistor 45 to conduct current between the collector terminal 46 and the emitter terminal 52, thereby holding the relay 54 in an operative condition. On the generator side of the capacitor 43, the votlage will vary from a positive value to a negative value in a sinusoidal manner. On the base side of the capacitor 43 the voltage will alternate from ground potential to a negative potential since the diode 51 will prevent the signal from being positive.

As the base voltage at the base terminal 44 becomes more negative, transistor 45 is caused to conduct more current through the collector terminal 52 and emitter terminal 46 until the relay 54 is energized to hold the contacts 56, 57 open. Since the input voltage to the base terminal 44 is an alternating voltage, it will return back to zero at the end of each cycle, causing current to decrease through the transistor 45. Relay 54 would deenergize during each cycle if this transistor connection alone were utilized. However, the capacitor 53 is such that it will store a sufficient charge to maintain current through the relay 54 until the next negative cycle at the base terminal 44. The required charge will be restored to the capacitor 54 during each cycle when the voltage at base 44 causes the transistor 45 to conduct.

The ultimate operation of this system is identical to that shown in FIGURE 3. So long as the generator 15 is operating at its required level by proper rotation of the shaft monitored by it, the lamp 41 will remain lighted and the relay 54 will remain energized. If the generator 15 is slowed or stopped, lamp 41 will dim or go out entirely and the relay 54 will be deenergized, causing the lamp 58 and signal horn or buzzer 60 to operate. Obviously, the same circuit can be provided for any number of generators by merely duplicating the connections to the common lamp 58 and buzzer 60.

The transistor circuit shown in FIGURE 4 will operate on either 6 or 12 volt batteries. It can be used on equipment that is grounded either at the negative or positive terminal of the secondary source of energy so long as the proper battery terminal is connected in the circuit as shown. The collector circuit as shown, must always be connected with a negative polarity relative to the emitter if a PNP type of transistor is used. An equivalent NPN type of transistor could be substituted if the negative and positive voltages were reversed from that illustrated. In such an instance, the polarity of the diode 51 must be reversed.

Figure 5:
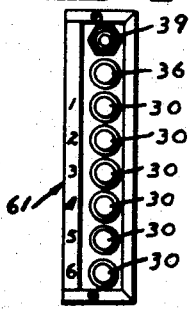
FIGURE 5 is a plan view of a typical light panel.

FIGURE 5 illustrates a typical control panel box for the signal lamps used in this system. Using the numerals shown in FIGURES 1 through 3, at the top is switch 39 which can manually open the circuit to horn 35, the horn 35 being any type of electrical sounding device that can be heard above the background noise of the machine. Directly below it is the panic light 36 that signals a malfunction in the machine. Directly below this lamp are the additional lamps 30 used to indicate proper operation of each generator. The control panel box is shown with six such lamps, and is a typical type of box that might be used for any number of generators up to and including six. The box, generally designated by the numeral 61, can be fixed directly adjacent to the conventional control panel monitored by the operator of the machine so as to be easily observable by the operator at all times.

Thus it will be seen that I have devised a particularly simple alarm system to signal proper operation of rotating shafts on a machine such as a combine. Many modifications might be made in this apparatus, substituting equivalent devices where desired, without deviating from the basic concepts described above. For this reason, only the following claims are intended to limit or restrict the scope of my invention.

Having thus described my invention, I claim:

1. A monitor attachment for portable harvesting machine to appraise the operator of whether an operating element is functioning properly by sensing whether a shaft of the operating element is rotating, said monitor attachment comprises:
   (a) an electrical generator mounted on the machine adjacent the shaft being monitored that generates a voltage substantially proportional to the speed of the generator;
   (b) a friction drive means operably connected between the shaft and the generator to transmit the rotation of the shaft to the generator;
   (c) a voltage sensitive relay means having an operating coil responsive to the voltage of the generator and further including normally closed contacts adapted to be opened when the coil is energized;
   (d) a source of electrical power;
   (e) a warning means wired across said source of electrical power in series with the normally closed contacts for warning the operator when the shaft stops rotating.

2. The monitor attachment as defined in claim 1 further comprising a signal lamp connected in parallel with the relay for indicating when the shaft is rotating.

3. The monitor attachment as defined in claim 1 wherein the generator is mounted parallel with the shaft being monitored and the friction drive means includes a first friction drum mounted on the shaft and a second friction drum mounted on the generator shaft engaging the first friction drum.

4. The monitor attachment as defined in claim 1 wherein the warning means includes a warning light and a buzzer.

5. The monitor attachment as defined in claim 1 wherein the electric generator is an A.C. generator.

6. The monitor attachment as defined in claim 1 further comprising a normally closed switch mounted near the operator of the portable harvesting machine and connected in series with the warning means to enable the operator to render ineffective the warning means.

7. The monitor attachment as defined in claim 1 further comprising a transistor amplifier circuit operably wired between the generator and the coil of said relay means, said amplifier circuit being operative only when the shaft is rotating.

8. The monitor attachment as defined in claim 7 wherein the transistor amplifier circuit includes a transistor wired in series between the generator and the coil across the electrical power source with the base of the transistor connected to the output of the generator through a capacitor and to the power source through a diode in such a fashion that power is supplied to the coil from said power source only when said shaft is rotating.

9. A monitoring system for portable harvesting machine such as a combine to appraise the operator of whether the harvesting operating components are functioning properly by sensing whether specific shafts of the components are rotating, comprising:
   (a) a plurality of electrical voltage generators mounted to the machine adjacent to and parallel with respective shafts being monitored;
   (b) a plurality of friction means operably connecting the shafts to the respective generators for transmitting the rotation of the shafts to the generators;
   (c) a plurality of voltage amplifiers separately wired to respective outputs of the voltage generators for amplifying the voltage outputs of the respective generators;
   (d) a plurality of relays, each having a coil wired to the output of a respective amplifier and energized by the voltage generated therefrom, each relay further including a set of normally closed contacts adapted to be opened when the coil is energized;
   (e) a plurality of operating lights mounted in a panel adjacent the operator and connected to the output of respective generators for indicating when illuminated that the respective monitored shafts are rotating; and
   (f) an audible warning means connected electrically in parallel across the relay contacts for generating an audible warning when one or more of the contacts close indicating that one or more of the shafts have stopped.

10. A monitoring system as defined in claim 9 further comprising a red warning light mounted in the panel adjacent the operator and electrically connected in parallel across the relay contacts for illuminating when one or more of the contacts close.

References Cited
UNITED STATES PATENTS

| | | | |
|---|---|---|---|
| 2,301,115 | 11/1942 | Gilbert | 324—70 |
| 2,542,638 | 2/1951 | Desch | 324—70 |
| 2,927,302 | 3/1960 | Steigerwald | 340—271 X |
| 2,941,120 | 6/1960 | Harman et al. | 340—271 |
| 2,980,369 | 4/1961 | Ruof | 324—70 |
| 2,993,147 | 7/1961 | Wright et al. | |

JOHN W. CALDWELL, *Primary Examiner.*

NEIL C. READ, *Examiner.*

D. L. TRAFTON, *Assistant Examiner.*